United States Patent

Wolf

[11] Patent Number: 6,034,447
[45] Date of Patent: Mar. 7, 2000

[54] CONNECTOR FOR CONSUMER NETWORKS

[75] Inventor: Johann Wolf, Pentling, Germany

[73] Assignee: Siemens AG, Munich, Germany

[21] Appl. No.: 09/101,853

[22] PCT Filed: Jan. 8, 1997

[86] PCT No.: PCT/DE97/00013

§ 371 Date: Dec. 11, 1998

§ 102(e) Date: Dec. 11, 1998

[87] PCT Pub. No.: WO97/26695

PCT Pub. Date: Jul. 24, 1997

[30] Foreign Application Priority Data

Jan. 19, 1996 [DE] Germany .......................... 196 01 878

[51] Int. Cl.[7] .................................................. H01H 47/00
[52] U.S. Cl. ........................ 307/125; 307/130; 307/131
[58] Field of Search .................................. 307/125, 126, 307/130, 131, 135, 139, 140, 141.4, 143; 323/293, 297–298; 361/139, 143, 188, 187, 160

[56] References Cited

U.S. PATENT DOCUMENTS

| | | | |
|---|---|---|---|
| 3,611,036 | 10/1971 | Edson | 317/18 R |
| 4,137,557 | 1/1979 | Ciarniello et al. | 361/187 |
| 5,428,496 | 6/1995 | Buchta | 361/187 |
| 5,442,515 | 8/1995 | Wallaert | 361/187 |
| 5,528,131 | 6/1996 | Marty et al. | 323/901 |
| 5,608,598 | 3/1997 | Dieppedalle et al. | 307/143 |
| 5,717,562 | 2/1998 | Antone et al. | 361/187 |
| 5,763,961 | 6/1998 | Dreyer et al. | 307/116 |
| 5,896,260 | 4/1999 | Esposito | 361/187 |

FOREIGN PATENT DOCUMENTS

| | | |
|---|---|---|
| 0 259 845 | 3/1988 | European Pat. Off. . |
| 0 581 078 | 2/1994 | European Pat. Off. . |
| 0 621 674 | 10/1994 | European Pat. Off. . |
| U 94 04 607 | 9/1994 | Germany . |
| 43 44 018 | 5/1995 | Germany . |
| 4-355627 | 12/1992 | Japan . |

*Primary Examiner*—Jeffrey Gaffin
*Assistant Examiner*—Peter Zura
*Attorney, Agent, or Firm*—Kenyon & Kenyon

[57] ABSTRACT

A connection arrangement for secondary distribution systems which effects a connection in the state free of short circuits, within permissible performance quantities, by means of at least one interrupter assembly. Besides current and voltage sensors with a processing module, a connection branch parallel to the load, and a bridge branch, along the lines of a voltage divider, are also used to safeguard against making operations in case of a short circuit. The interrupter assembly is bridged by the bridge branch which, according to the function, contains an ON switch. In the event of a short circuit, the voltage at the actuating element does not suffice to close the interrupter assembly.

5 Claims, 2 Drawing Sheets

CONNECTOR FOR CONSUMER NETWORKS

FIELD OF THE INVENTION

The present invention relates to a connection arrangement for secondary distribution systems, which effects a connection in the state free of short circuits, within permissible performance quantities, by means of at least one interrupter assembly.

BACKGROUND OF THE INVENTION

Many short-circuits arise during closing operations, since a suitable tripping device of a circuit breaker, for example, does not function until the short circuit is already flowing. In the same way, many circuits remain connected, although no current is being drawn. Even in the case of overvoltage and undervoltage, the circuits usually remain closed for the most part. For some of the problems described, partial solutions, exist such as undervoltage tripping devices for contactors and circuit breakers, as well as short-circuit tripping devices in circuit breakers.

SUMMARY OF THE INVENTION

An object of the present invention is to develop a connection arrangement for secondary distribution systems, which makes it possible to safeguard against making on a short circuit, in a single arrangement. In addition to functioning with current and voltage sensors and with a processing module, the arrangement functions with a series connection composed of a connection branch, parallel to the load, and a bridge branch that bridges the interrupter assembly. The bridge branch contains an ON switch, the bridge branch, together with the connection branch, forming a voltage divider. Testing for a short circuit includes performing a check for unacceptably high overloading that is to be expected due to faulty states. These faulty states may be resistances which are too low on the load side.

European Patent Application No. 0 621 674 illustrates a conventional connection arrangement without a series connection composed of a connection branch and a bridge branch. The conventional connection arrangement connects a load only when there is not a short circuit on the load side. For this purpose, an impedance measurement is taken. Here, the connection arrangement is for a load to secondary distribution systems. The arrangement effects a connection when free of short-circuits, within permissible performance quantities, with the assistance of at least one interrupter assembly. Current and voltage sensors are connected to a processing module via which a connection branch may be brought into the circuit and disconnected. The connection branch, designed as a connection circuit, is metallically separated from the load circuit and bridge by way of the normally open contact. In the conventional connection arrangement, provision is made in the connection circuit for an actuating element which is operatively connected to an interrupter assembly in the secondary distribution system. The interrupter assembly is also bridged by a bridge branch with a resistor. However, in the conventional arrangement, an ON switch provided therein does not have the function of closing the connection arrangement operationally.

The connection arrangement functions as a universal monitoring relay may be a centralized, thus compact arrangement, or may be a decentralized arrangement. The connection arrangement has the following properties:

a making operation is not performed on an existing short or large overload;

neither a making operation nor a breaking operation is performed in response to a system voltage which is too high or too low;

neither a making operating nor a breaking operating is performed when the load is too small, or when there is no load at all;

it is manually connectable and disconnectable on site; and it is manually switchable, for example, via a bus interface.

DETAILED DESCRIPTION

Figure 1:
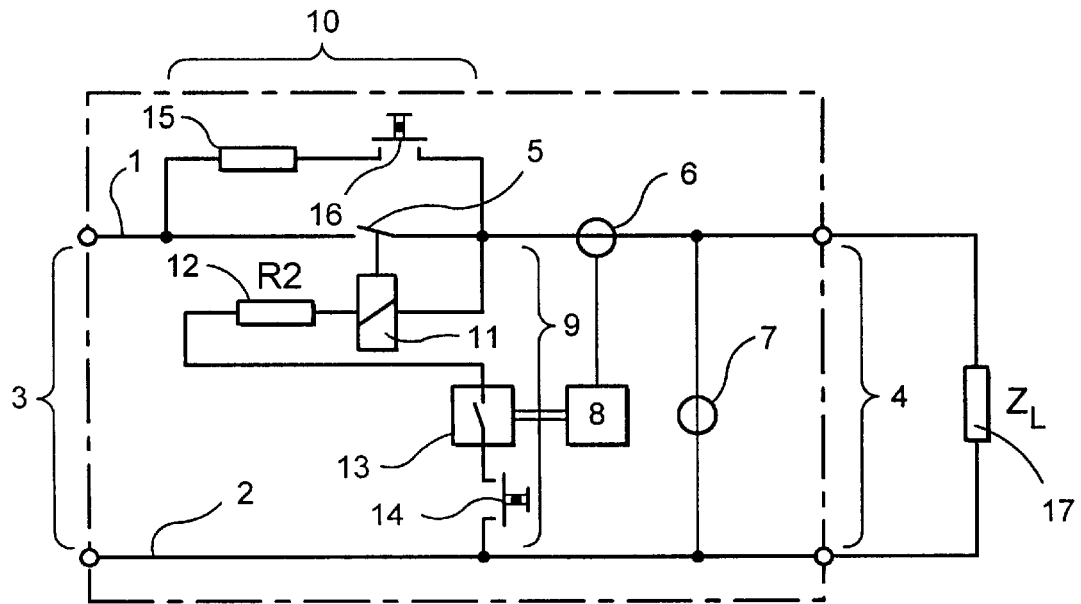
FIG. 1 illustrates a connection arrangement in accordance with an exemplary embodiment of the present invention.

The connection arrangement according to FIG. 1 for a secondary distribution system, having outer conductor 1, formerly called phase conductor, and neutral conductor 2, makes it possible for a supply side 3 to be connected to a load side 4 with the aid of an interrupter assembly 5. In the exemplary embodiment according to FIG. 1, the connection arrangement has a current sensor 6, a voltage sensor 7 and a processing module 8. A connection branch 9 is arranged parallel to the load, and is connected to outer conductor 1 and neutral conductor 2. Connection branch 9 is connected in series to a bridge branch 10.

In the exemplary embodiment, connection branch 9 has an electromagnetically operated mechanism 11 having a resistance Z (which is optionally complex), a resistor 12, R2, and a switching element 13. In addition, provision can be made for a circuit breaker 14, for example as an OFF switch. Bridge branch 10 has a resistor 15 and a circuit closer 16 having the function of an ON switch.

When circuit closer 16 is actuated, current sensor 6 and voltage sensor 7 can measure values which are fed to processing module 8. When these values lie within a permissible range, switching element 13 is switched into conduction, and a voltage division is effected by way of bridge branch 10 and connection branch 9.

In an exemplary embodiment, bridge branch 10 forms a resistor which is adjusted so that, in response to a permissible load 17, only an insignificant voltage drop occurs and, in response to a short circuit, a restriction is made to compatible (tolerable) currents. Additionally, the resistance of bridge branch 10 is adjusted with respect to connection branch 9, along the lines of a voltage divider, so that, in response to a short circuit, instead of a load 17 on bridge branch 10, so much voltage drops off that the voltage in connection branch 9 does not suffice to drive actuating element 11. Generally, appropriate precautions can be taken, so that in the event of a short circuit, suitably reduced voltage can be applied at the connection branch. Moreover, switching element 13 only permits the supply voltage or system voltage to be connected to a load 17 for as long as current sensor 6 signals a not too great current to processing module 8. It is controlled via voltage sensor 7, whether a voltage is being applied that is too high or too low relative to predefined permissible voltages.

A short circuit existing prior to a making operation of the interrupter assembly is detected on load side 4 on the basis of a voltage division through bridge branch 10 and connection branch 9. In this case, the connection branch is shunted to the load by a comparatively small resistance in the case of a short circuit.

Figure 2:
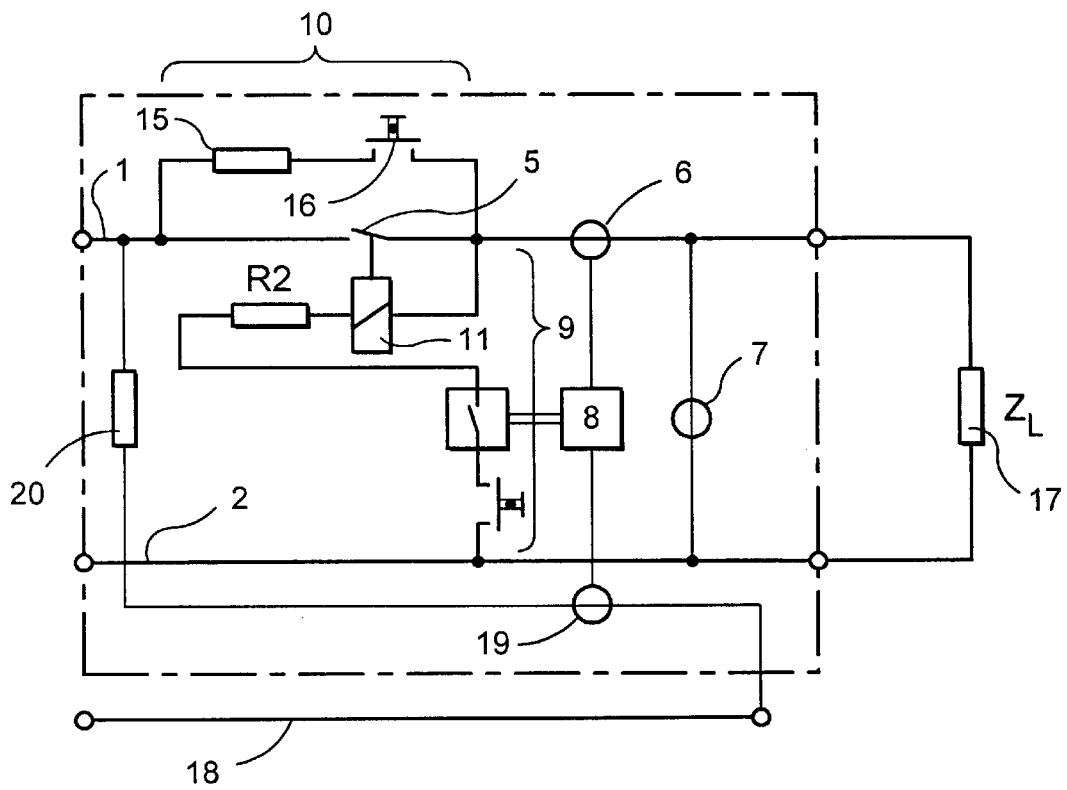
FIG. 2 shows a connection arrangement including additional protective conductor supervision in accordance with the present invention.

A protective conductor supervision shown in FIG. 2 provides an enlarged protection. Protective conductor 18 receives a test current that is measured by a sensor 19 used as a measuring-current sensor. In the exemplary embodiment, the measuring current from outer conductor 1 is applied through a series resistor 20 to protective conductor 18. The system current can be detected in sensor 19 by an optocoupler.

Figure 3:
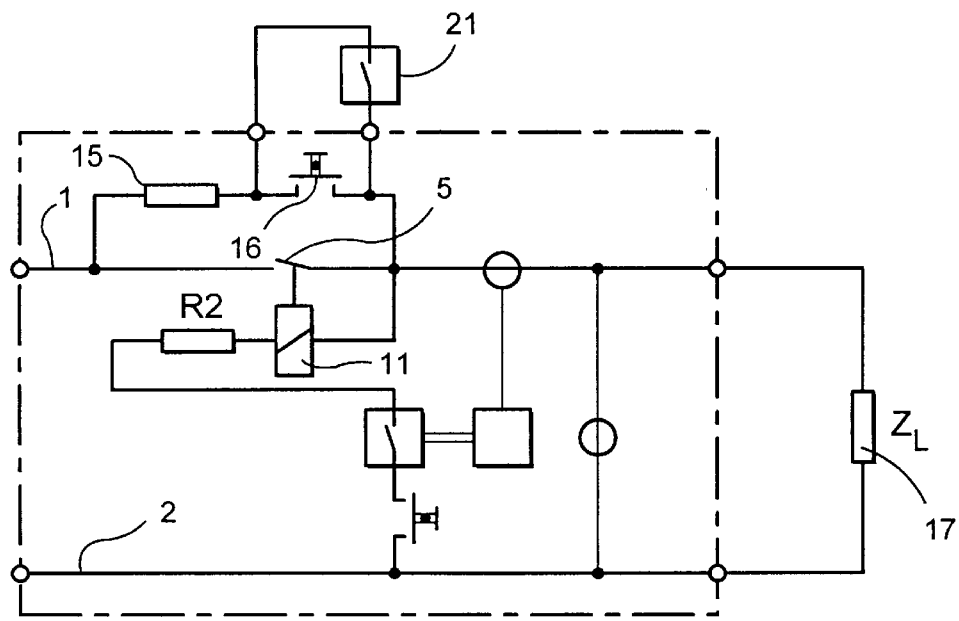
FIG. 3 shows a connection arrangement including an additional device for remote switching in accordance with the present invention.

A remote closing operation can be attained by a connection arrangement shown in FIG. 3. Circuit closer 16 is shunted inside or outside of a connection arrangement, designed as a device, by a separate switching element 21. A remote tripping operation can also be carried out by a series connection of switching elements, along the lines of break contacts, to circuit breaker 14 in connection branch 9. The remote tripping operation can also be effected directly via processing module 8 and switching element 13.

Figure 4:
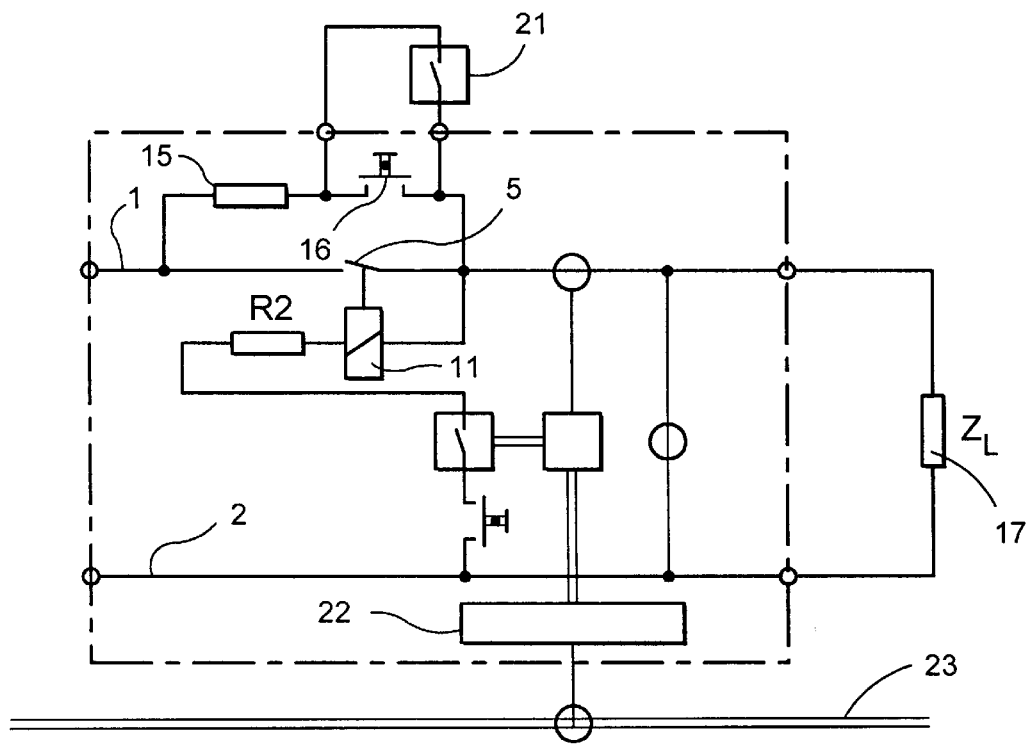
FIG. 4 illustrates a connection arrangement including an additional bus interface in accordance with the present invention.

All the connection arrangements shown in FIGS. 1, 2 or 3 can be connected by a bus interface 22 to a bus line 23 of a bus system. The embodiment shown in FIG. 4 conforms with that according to FIG. 3. Interrupter assembly 5 and actuating element 11 can be realized together as a circuit breaker. In addition, in view of the remote control, the functions of the arrangement according to FIG. 4 can be realized as a circuit breaker with remote-controlled mechanism, e.g., with an electromagnetically operated mechanism or motor-operated mechanism.

I claim:

1. A connection arrangement for connecting a load at a load side to a distribution system at a supply side, comprising:

a current sensor;

a voltage sensor;

an interrupter assembly effecting a connection between the load and the distribution system in a state free of short-circuits at the load side;

a connection branch coupled in parallel to the load, the connection branch including an actuating element, the actuating element being operatively connected to interrupter assembly, a processing module coupled to the current sensor and the voltage sensor, the processing module bringing the connection branch into circuit with the load side and disconnecting the connection branch from the circuit; and a bridge branch including a resistor and an ON switch, the bridge branch connected in parallel to the interrupter assembly, the bridge branch and the connection branch together forming a voltage divider.

2. The connection arrangement according to claim 1, wherein the bridge branch includes a resistor, an impedance value of the resistor being set so that, in response to a load at the load side being within a predetermined range, the resistor provides a substantially insignificant voltage drop, and in response to a short circuit at the load side, a current is within a predetermined current range, and wherein the impedance value of the resistor is set relative to a resistance of the connection branch so that in response to the short circuit at the load side, the connection branch provides a voltage drop insufficient to drive the actuating element.

3. The connection arrangement of claim 1, wherein the processing module is coupled to a bus conductor of a bus system.

4. The connection arrangement of claim 1, wherein the interrupter assembly and the actuating assembly include a circuit-breaker with a remote-controlled mechanism.

5. The connection arrangement according to claim 1, wherein the actuator actuates the interrupter assembly.

* * * * *